United States Patent [19]

Ackermann et al.

[11] 4,419,474

[45] Dec. 6, 1983

[54] FLAME-REPELLENT POLYSILOXANE MOLDING COMPOSITIONS

[75] Inventors: Jürgen Ackermann, Bergisch-Gladbach; Hans-Heinrich Moretto, Cologne; Wilfried Kniege, Bergisch-Gladbach; Werner Rauer, Leverkusen, all of Fed. Rep. of Germany

[73] Assignee: Bayer Aktiengesellschaft, Leverkusen, Fed. Rep. of Germany

[21] Appl. No.: 313,112

[22] Filed: Oct. 20, 1981

[30] Foreign Application Priority Data

Nov. 4, 1980 [DE] Fed. Rep. of Germany ....... 3041588

[51] Int. Cl.³ ............................................. C08L 83/06
[52] U.S. Cl. .................................. 524/195; 524/188; 524/211; 524/837
[58] Field of Search .................. 524/188, 211, 195

[56] References Cited

U.S. PATENT DOCUMENTS

| | | | |
|---|---|---|---|
| 2,945,838 | 7/1960 | Prober | 524/211 |
| 3,704,273 | 11/1972 | Arney | 524/211 |
| 4,087,399 | 5/1978 | Hamada et al. | 524/91 |

*Primary Examiner*—Wilbert J. Briggs, Sr.
*Attorney, Agent, or Firm*—Sprung, Horn, Kramer & Woods

[57] ABSTRACT

In a polysiloxane molding composition which can be cured to give flame-repellent products, comprising
(a) a diorganopolysiloxane of the formula

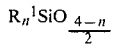

in which
n is 1.9 to 2.05, and
$R^1$ is an alkyl, alkenyl and/or or aryl radical with 1–8 C-atoms,
(b) finely divided $TiO_2$ with a surface area, measured by the BET method, greater than 20 m²/g and a particle size less than 0.5 μm,
(d) platinum and/or one of its sulphur-free compounds, and
(e) a curing agent, the improvement which comprises about 0.05 to 10% by weight of (a) to (e) of nitrogen compound of the formula

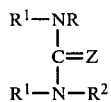

in which
R is H, phenyl, alkyl with 1–6 C-atoms, tolyl, nitrile, $-NHR^2$, $-CH_2OR^2$, $-CH_2COOR^2$, $-C(=NH)NHR^2$, $-CO-NH-R^2$ or $(R^1)_2C-$,
$R_2^1$ is H, alkyl with 1–6 C-atoms, $Si(CH_3)_3-$ or R,
$R^2$ is H or $-CO-R$, and
Z is NH, O or NR, or a salt thereof. Articles molded therefrom and then cured are of enhanced flame-repellency.

4 Claims, No Drawings

FLAME-REPELLENT POLYSILOXANE MOLDING COMPOSITIONS

The present invention relates to polyorganosiloxane molding compositions which have an increased resistance to inflammation and improved self-extinguishing properties without impairing the known physiological harmlessness of siloxanes or polysiloxane molding compositions.

Increased protection and safety from fire are always being demanded by consumers, producers and insurance companies. It is also necessary to limit the extent of damage when rubber-like molding compositions are used, without having to forego the advantages of rubber-like materials for certain shaped articles or to accept a loss in the insulating effect of siloxane isolation materials for controlling and measuring cables.

Finally, the danger arising from the nature and amount of the constituents to be mixed during the production of such shaped articles should be kept as low as any danger arising from the combustion gases produced upon burning of the shaped article. A final requirement of flame-repellent organopolysiloxane molding compositions is that they are economical to prepare, that is to say they can be prepared without problems on customary mixing units and without abnormal temperature restrictions.

Organosiloxane molding compositions indeed generally have an improved stability to temperatures above 150° C. compared with other types of rubber, but, as is the case with other rubber mixtures, they have the disadvantage that they can be ignited at higher temperatures and then exhibit scarcely any self-extinguishing properties.

In the past, numerous attempts have been made to eliminate or reduce these disadvantages. The use of $TiO_2$ is described in U.S. Pat. No. 2,684,349. British patent specification No. 1,104,606 describes, for example, the admixing of platinum-containing materials to polysiloxanes. The standard thereby achieved was improved further by a combination of platinum and a particular carbon black (German Offenlegungsschrift 2,034,919) or pyrogenic $TiO_2$ (German Offenlegungsschrift 2,035,361).

Molding compositions prepared in this way have, however, the disadvantage that the good ability to self-extinguish is not achieved with any of the customary curing agents, as is also stated in U.S. Pat. No. 3,996,188. There is also the disadvantage of an anticipated undesired coloration of the shaped articles by the addition of relatively large amounts of the pigmented heat stabilizers, such as carbon black or iron oxides.

For later applications, for example cable insulation, this can mean a restriction or increased expenditure in characterization by color, especially in the case of carbon black. If carbon black is used, this must furthermore be exceptionally free from sulphur. The use of siloxane molding compositions for electrical insulation and elastomeric shaped articles excludes the flame-retardants, such as compounds of phosphorus or halogen and antimony oxides, which are known per se for other elastomers since these additives either reduce the electrical resistance or impair the mechanical properties, or they are not always suitable for toxicological reasons.

Some of the abovementioned aims have been achieved in the preparation of molding compositions according to German Auslegeschrift 2,353,826, which claims platinum together with an azo compound of the formula R—N=N—R or

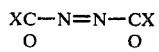

as the flameproofing additive. In particular, the problem of flameproofing which is independent of the curing agent could be solved. Such a system also has very good self-extinguishing properties with dialkyl peroxides, the level of the ability to self-extinguish generally being significantly superior to that of the system $Pt+TiO_2$ if $TiO_2$ is also added to the molding compositions containing platinum and very small amounts of azoisobutyronitrile or azodicarboxamide. The significant improvements compared with the molding compositions in German Auslegeschrift 2,035,361 are, however, largely restricted to the two nitrogen compounds mentioned, which are given as representatives of the general formula in German Auslegeschrift 2,353,826. Moreover, the use of N-containing compounds for pigmenting, as described in German Auslegeschrift 2,812,401, or as an additive in flame-repellent elastomers, as described in German Offenlegungsschrift 2,829,805 or German Offenlegungsschrift 2,726,567, is also known.

The nitrogen compounds proposed in German Offenlegungsschrift 2,502,936 achieve the level of self-extinguishing ability of those in German Auslegeschrift 2,353,826. In the case of the additives which are mentioned in German Auslegeschrift 2,353,826 and German Offenlegungsschrift 2,502,936 and which can improve the self-extinguishing ability of molding compositions containing $Pt-TiO_2$ additives, the toxicity, handling and low decomposition points and hence the free radical preliminary crosslinking which the siloxane molding compositions containing vinyl groups undergo in some cases are limitations on the economical preparation of the molding compositions.

Besides eliminating the disadvantages described, there is also the desire to extend flameproofing also to systems which contain certain amounts of polymers with SiOH groups. In particular, it is known that the ability to self-extinguish decreases the case of siloxane molding compositions containing SiOH or if the flame-repellency is measured in moist air, as stated in German Offenlegungsschrift 2,035,361 and N. Grassie and Mac-Farlane, Eur. Polymer Journal 14 (1978) pages 875–884. As well as the abovementioned aims of processing safety from toxicological and industrial points of view, there is therefore the desire, in practice, for "single cure" properties. For cable insulation, this means the build-up of as high as possible a level of flameproofing after a short period of vulcanization in a hot air tunnel, without a post-vulcanization treatment. The flameproofing must be so effective that, in spite of the presence of volatile siloxanes in particular siloxane-containing processing auxiliaries and peroxide residues, no impairment of the self-extinguishing ability arises, even without a post-vulcanization treatment.

These requirements could not hitherto be fulfilled completely by the systems proposed.

The present invention thus relates to polysiloxane molding compositions which can be cured to give flame-repellent products and comprise (a) a diorganopolysiloxane which has the average formula

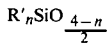

with 1.9–2.05 organic radicals per Si atom, it being possible for the organic radicals to be alkyl, alkenyl and/or aryl radicals with 1-8 C atoms (b) a finely divided silicic acid and, if appropriate, also other fillers and/or inorganic pigments, (c) finely divided TiO$_2$ with a surface area, mesured by the BET method, greater than 20 m$^2$/g and a particle size less than 0.5 μm, (d) platinum and/or one of its sulphur-free compounds, with or without a carrier, (e) a curing agent, such as, for example, an organic peroxide and/or a siloxane or hydridosilane, and in an amount of 0.05–10 parts by weight of the abovementioned constituents of the mixture (f) a nitrogen compound selected from the group consisting of uric acid, guanine, melamine and a compound of the general formula (I),

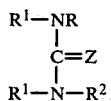

in which
R is H, phenyl, alkyl with 1-6 C atoms, tolyl, nitrile, —NHR$^2$, —CH$_2$OR$^2$, —CH$_2$COOR$^2$, —C(=NH)NHR$^2$, —CO—NH—R$^2$ or (R$^1$)$_2$C—,
R$^1$ is H, alkyl with 1-6 C atoms, Si(CH$_3$)$_3$— or R
R$^2$ is H or —CO—R and
Z is NH, O or NR,
or a salt thereof.

Non-toxic siloxane molding compositions which, after a short period of curing, have good flame-repellent and flame-extinguishing properties and in which the electrical insulating ability and mechanical properties are not impaired relative to those of comparable siloxane molding compositions are thus to be provided according to the invention.

Surprisingly, it has now been found that siloxane molding compositions which contain Pt compounds together with finely divided TiO$_2$, and moreover also derivatives of guanidine or urea, result in flame-repellent and self-extinguishing properties which are the same as or better than those of molding compositions which contain only Pt+TiO$_2$ or those which contain Pt and certain azo compounds.

The molding compositions according to the invention also have the advantage that the additives are in most cases toxicologically acceptable, processability is more reliably ensured and good flameproofing is ensured even when certain amounts of volatile siloxane and peroxide residues are present.

The effectiveness of the guanidine compounds is surprising because other nitrogen-rich compounds, such as, for example, hydrazinedicarboxamide and pyrazole derivatives (German Offenlegungsschriften 2,502,936 and 2,812,401) are considerably less effective.

The use of guanidine additives enables flameproofed siloxane molding compositions to be prepared independently of the curing agent or peroxide employed. They do not present the difficulties of mixtures filled with carbon black, and, from a toxicological point of view, are to be regarded as having fewer problems than some of the flameproofing additives containing azo derivatives. The newly provided mixtures also have an improved flame-repellency without volatile siloxane residues being removed by post-vulcanization treatment.

The siloxane molding compositions according to the invention contain a diorganopolysiloxane, or mixtures of diorganopolysiloxanes, with units of the average formula

in which
R can be one or more substituted or unsubstituted radicals such as methyl, ethyl, vinyl, aryl or arylethyl.

Different radicals can occur side-by-side within one molecule. Substituents on R can be Cl, CN, F or vinyl. The number "n" is a positive number between 1.9 and 2.05. The siloxane molding compositions according to the invention should furthermore contain a finely divided silicic acid, if appropriate also non-reinforcing fillers, such as quartz flour, iron oxides and diatomaceous earth, and other pigments, curing agents, such as the customary peroxides and/or hydridosiloxanes or hydridosilanes, and, in order to achieve their flame-repellent properties, platinum compounds and finely divided TiO$_2$.

The siloxane molding compositions which can be vulcanized according to the invention and contain constituents (a)–(f) not only have an increased resistance to inflammation and further burning, but also exhibit mechanical properties which are equally as good as those of molding compositions without additives such as customary heat stabilizers (for example compounds of iron, of zirconium or of the rare earths). If desired, however, such additives can also be used.

Constituent (a) of the molding compositions according to the invention comprises the customary organopolysiloxanes or mixtures prepared therefrom which, as is known, are the principal constituents, with (b), for the mechanical properties of the cured rubbers. Their composition can be represented by the general formula

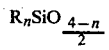

in which
the radicals R are the abovementioned hydrocarbon radicals with the following possible substituents:
Cl, CN or CF$_3$, and
the number n should be between 1.9 and 2.05.
The chain ends are formed by OH, trimethylsilyl, dimethylvinylsilyl, diphenylvinylsilyl or methylphenylvinylsilyl groups.

The viscosities of the organopolysiloxanes which can be employed are within the range of 200 to 200×10$^6$ mPas, namely the range which applies to polymers which are usually employed for silicone elastomers.

In the case where further phenyl or vinyl units are to be incorporated into the polymers, as well as into the end groups, their use is restricted to 0.01–60% by weight of diphenylsiloxy or methylphenylsiloxy units or 0.01–3% by weight of vinylmethylsiloxy units or phenylvinylsiloxy units relative to the total amount of constituent (a).

The term mixture in this context means mixtures of two or more organopolysiloxanes such as are described in British patent specification No. 1,040,408 and German Auslegeschrift 1,020,456, a selected radical R predominating in one component of (a). In the case where vinylsiloxy radicals predominate, less of this organopolysiloxane which is richer in vinyl groups is mixed than of the other siloxane component of (a), with the abovementioned limitation.

Theorganopolysiloxane (a) is preferably a linear dimethylpolysiloxane with less than 2% of vinylmethylsiloxy units.

The filler (b)—either charged or uncharged—can be one of the known finely divided and reinforcing silicon dioxides which are obtained by flame pyrolysis or precipitation. They should preferably have a surface area, measured by absorption by the BET method, of 130–500 m²/g in order to achieve sufficient strength. 20–100 parts by weight of reinforcing filler should be employed.

Mixing-in uncharged reinforcing fillers necessitates the use of processing auxiliaries, such as certain silanols, siloxanols, alkoxysilanes or silazanes. Such generally known compounds can be: diphenylsilanediol (U.S. Pat. No. 3,551,382), $HO(me_2SiO)_nH$ (French patent specification No. 1,492,655), $me_3SiNHSime_3$ (British patent specification No. 1,024,234), $RO(me_2SiO)_nH$ (German Offenlegungsschrift 2,521,937 and U.S. Pat. No. 3,377,311), $Z_2Si\ R\ X$ (French patent specificaion No. 2,382,456) and $H_2O$ (German Auslegeschrift 1,224,038).

They are employed in order to avoid so-called "crepe hardening" of the mixtures. The expert can obtain the amount to be employed, which is between 1 and 30 parts by weight, depending on the surface area and the nature, per 100 parts of the reinforcing fillers, from the intended viscosity of the mixture and the storage stability.

Moreover, in addition to the reinforcing fillers, it is also possible to employ from 0.1 to 100 parts by weight of inert fillers with a particle size of less than 50 μm. Examples of such fillers are: quartz flours, diatomaceous earths, glass fibers, asbestos fibers, mica and inorganic pigments, such as iron oxides, calcium carbonate, zinc oxide, colored spinels, carbon blacks or aluminum oxides.

Constituent (c), which is an important constitutent, together with (d) and (f), for lasting flameproofing, comprises finely divided titanium oxides with a large surface area, preferably those with a particle diameter of less than 0.5 μm and a surface area, measured by absorption by the BET method, of greater than 20 m²/g. Not only can the titanium oxides obtained by flame hydrolysis, such as are claimed in German Offenlegungsschrift 2,035,361, be advantageously employed, but titanium oxides which are formed by hydrolytic precipitation from $TiCl_4$ or titanates can also advantageously be employed, together with constituents (d) and (f), for the aims according to the invention. The $TiO_2$ material should be free from strong acids and bases and should have a sulphur content below 0.2% by weight, the pH value of the precipitated product preferably being between 4 and 8. Constituent (b) is employed in an amount of 10–200 parts by weight, preferably 20–100 parts by weight, per 100 parts by weight of (a). Constituent (c) should be present in an amount of 0.5–60, preferably 1–45, parts by weight—likewise per 100 parts by weight of (a).

The use of constituent (d) is of particular importance for achieving flameproofing within this system. The amount of constituent (d) and its uniform distribution are especially important. The oxidation level of the platinum in its compounds is of minor importance. Constituent (d) can therefore be added as metallic platinum or added as a platinum complex on a carrier or added directly. Possible carriers are all the fine-particled mineral materials, such as asbestos, charcoal, silicic acids or aluminum oxides. The restriction on the carriers and Pt compounds is that these substances should be free from sulphur.

Effective platinum complexes prove to be Pt-containing hydrosilylation catalysts with the following ligands: chlorine, carbonyl, bromine, iodine, olefins, alcohols, ketones, ethers, amines and phosphines.

To achieve the action according to the invention, constituent (d) is employed in an amount of 3–400 parts by weight of platinum per million parts by weight of constituent (a).

The molding compositions according to the invention are distinguished by the additional use of component (f), the flame-repellancy of such moulding compositions thereby being improved in comparison with the molding compositions containing only constituents (a)-(d) and (e).

The effectiveness according to the invention is achieved by an amount of 0.05–10.0 parts by weight of the urea derivatives described in more detail below per 100 parts by weight of (a).

Urea derivatives of the general formula

in which

R is H, phenyl, alkyl, tolyl, nitrile, $-NHR^2$, $-CH_2OR^2$, $-CH_2COOR^2$, $-C(=NH)NHR^2$, $-CO-NH-R^2$ or $(R^1)_2C-$, $R^1$ is H, alkyl, R or $Si(CH_3)_3$, $R^2$ is H or $-CO-R$ and Z is NH, O or $NR^1$, which can be employed according to the invention are: dicyanoguanidine, cyanourea, guanylurea, urea, methylolurea, aminourea, semicarbazide, guanidine, cyanoguanidine, aminoguanidine, diguanidine, arylguanidines and aryldiguanidines, and partial oxidation or decomposition products (melons) of the guanidines mentioned, including guanine, uric acid and melamines. A sufficient effect is achieved by 0.05–10, preferably 0.1 to 5, parts by weight per 100 parts of constituent (a).

The required uniform distribution is achieved, for example, by very fine grinding and intensive mixing with constituents (a)-(d).

Constituent (e) comprises the curing agents which are customary for siloxane molding compositions and which vulcanize the rubber after they have been mixed with the molding compositions or after they have been mixed with the molding compositions and the mixtures have been heated.

Examples of such curing agents are the organic peroxides customary for products obtained by hot vulcanization, such as bis-benzoyl peroxide, bis-2,3-, -2,4- or -2,5-dichlorobenzoyl peroxide, di-tert.-butyl peroxide, butyl perbenzoate, dicumyl peroxide and 2,5-bis-(tert.-butylperoxy)-2,5-dimethylhexane.

Curing can, however, also be effected with hydridosiloxanes or silanes. With the correct choice of constituent (a), the molding compositions can also be cured by some of the compounds of constituent (f), such as could be demonstrated in German Auslegeschrift 1,166,470 and German Auslegeschrift 1,120,605.

In the case where siloxanes or silanes containing Si-H groups are employed, 1-6 mols of Si-H-siloxy units are mixed in, via component (e), per mol of vinylsiloxy groups in component (a).

The stabilization to the effect of heat which is achieved via constituents (a) – (f) can be further increased by the heat stabilizers which can additionally be added. Heat stabilizers which are customary for this purpose are very finely divided iron oxides ($-Fe_2O_3$ and $\gamma-Fe_2O_3$), iron salts or complexes and compounds of zirconium, of titanium or of rare earths, in particular of cerium.

The silicone molding compositions according to the invention which have been described are cured with the curing agents (e) and, where relevant, (f) at 60–350°C. under normal or increased pressure for 1–3.600 seconds. The so-called A-stage of vulcanization is obtained. Post-vulcanization treatment can then be effected for 1–24 hours, and the vulcanizates resulting therefrom are called the B-stage. The mechanical and electrical properties of a typical mixture are shown in an example.

The advantages claimed according to the invention of (a) increased flame resistance and (b) increased resistance to burning can be seen, inter alia, from the values measured for (a) the oxygen concentrations for further burnings (LOI values) and (b) the self-extinguishing times measured in accordance with the method of VDE 0472 as the after-burn period in seconds after flaming, as well as from consumption by burning in percent by weight of the starting weight of the test sheet.

The advantages of the molding compositions according to the invention are furthermore that the ease of handling and the economical preparation and physiological acceptability are largely retained by the additives for increasing the flame-repellency, and the toxicities of the N-compounds employed are more favorable, compared with similar azo compounds which have a flame-repellent action.

The present invention is illustrated in more detail with the aid of the following examples (% data denote % by weight).

Vulcanizate strips from the A-stage and from the B-stage 2×150×10 mm in size were employed as test sheets for measuring the self-extinguishing ability.

Evaluation was carried out on vertically suspended test strips in accordance with the test method of VDE 0472, which makes severer demands on the material with respect to flaming temperature (1000° C.) and flaming time (15 seconds) than similar methods, such as, for example, UL 94 V (800° C./10 seconds) or UL 62, on cable sheathing.

This method differs from the other methods in that the freely suspended elastomer strips are in this case used with no contact with metallic conductors or frames which remove heat by conduction.

The self-extinguishing time or after-burn period is the interval after which, after removal of the flame, no further flame or smoldering could be detected on the sample.

Base mixture I: 100 parts by weight of a dimethylpolysiloxane (0.02% of vinylsiloxy units) which has a chain length of 6,000 units and a viscosity of $20.10^6$ mPas and trimethylsiloxy end groups are mixed with 53.5 parts by weight of a silicic acid with a surface area, measured by the BET method, of 200 m²/g in a kneader at 150° C. 3.7 parts of a siloxanol with 18% of SiOH groups and 4.2 parts of a siloxanol which additionally contains 5% of vinylmethylsiloxy units, as well as 0.55 part of hexamethyldisilazane are added as processing aids.

EXAMPLES 1-6

A platinum complex on silicic acid or a platinum complex which is soluble in siloxane, such as, for example, vinylsiloxy-platinum complexes, is dispersed in the finished mixture I in a mill or kneader or is dissolved in the finished mixture I.

The base mixture is then mixed with pyrogenic $TiO_2$ and the various urea derivatives. For curing, the rubbers are mixed with (a) 0.6% of dicumyl peroxide, or (b) 1.5% of a 50% strength dispersion of 2,4-dichlorobenzoyl peroxide in a siloxane oil, or (c) in Examples 22-24, one of the Si-H-containing siloxanes mentioned. 2 mm thick test sheets of the so-called A-stage of the vulcanizates are pressed at 170° C. (in the case of (c) and (a)) or at 125° C. (in the case of (b)) under 20 bars (20 . $10^5$ N/m²). The corresponding B-stage is obtained after heat treatment at 200° C. for 6 hours.

10×150×2 mm strips are cut out of the test sheets and are flamed for 15 seconds with a hot Bunsen burner flame with a temperature of about 1000° C. at an angle of 45°, in accordance with the test specification VDE 0472.

The after-burn time after removal of the flame is measured as the self-extinguishing time and, together with the loss of weight by consumption, serves as an evaluation criterion for the flame-repellency.

A further criterion is the lowest oxygen concentration at which further burning takes place, that is to say the LOI index measured in accordance with the method of ASTM 2863.

The base mixture for the flame-repellent additives to be compared has the following properties:

|  |  | Base mixture I | Base mixture I with additives c-f |
|---|---|---|---|
| Hardness DIN 53,505 | Shore A | 60 | 57 |
| Tensile strength | N/mm² | 7.5 | 7 |
| Elongation at break | % | 450 | 440 |
| Impact resilience | DIN 53,512 | 30 | 28 |
| Tear propagation resistance ASTM 624 B | N/mm | 20 | 24 |
| Breakdown strength | kV/mm | 25 | 25 |
| Specific resistivity | Ohms . cm | $10^{15}$ | $10^{15}$ |

|  |  | Parts by weight | | | | | |  |
|---|---|---|---|---|---|---|---|---|
|  |  | 1 | 2 | 3 | 4 | 5 | 6 |  |
| Base mixture |  | 100 | 100 | 100 | 100 | 100 | 100 |  |
| Titanium oxide |  | 3 | — | 3 | — | — | 3 |  |
| Platinum [ppm] |  | 45 | 45 | 45 | 45 | 45 | 45 |  |
| Azodicarboxamide |  | 0.2 | 0.2 | — | — | — | — |  |
| Cyanoguanidine |  | — | — | 0.2 | 0.2 | — | — |  |
| Self-extinguishing time |  |  |  |  |  |  |  |  |
| 2,4-Dichlorobenzoyl peroxide (CL 50) | A | 65 | 180 | 60 | 180 | 180 | 77 | seconds |
|  | B | 31 | 120 | 32 | 180 | 120 | 38 | seconds |
| Dicumyl peroxide | A | 103 | 180 | 50 | 180 | 180 | 130 | seconds |
|  | B | 54 | 180 | 35 | 180 | 180 | 79 | seconds |

| | Parts by weight | | | | | |
|---|---|---|---|---|---|---|
| | 1 | 2 | 3 | 4 | 5 | 6 |
| (DCP) | | | | | | 5 |

Example 3 shows that good self-extinguishing times can already be achieved in the A-stage of the vulcanizates with the molding compositions according to the invention. Furthermore, the peroxide-dependent flame-repellency can be better suppressed than with azodicarboxamide in Example 1. The examples show, in contrast to German Auslegeschrift 2,353,826, the necessity of the presence of $TiO_2$ in the molding compositions according to the invention and the molding compositions claimed in the German Auslegeschrift quoted, in order to obtain the best self-extinguishing properties.

EXAMPLES 7-17

Various urea derivatives are compared with an effective azo compound and with one another in the examples which follow. The mixtures contain 0.3 part by weight of the nitrogen compounds, 45 ppm of Pt and 3 parts by weight of pyrogenic $TiO_2$.
1. no nitrogen compound
2. semicarbazide HCl
3. dimethylolurea
4. urea
5. hydrazine dicarboxamide
6. guanidine carbonate
7. cyanoguanidine
8. diphenylguanidine
9. o-tolylguanidine
10. o-tolylbiguanide
11. aminoguanidine

| 1 | 2 | 3 | 4 | 5 | 6 | 7 | 8 | 9 | 10 | 11 | | |
|---|---|---|---|---|---|---|---|---|----|----|---|---|
| 62 | 42 | 82 | 33 | 123 | 35 | 75 | 47 | 64 | 61 | 150 | seconds A-stage | CL-50 |
| 45 | 35 | 73 | 40 | 45 | 51 | 35 | 48 | 123 | 39 | 78 | seconds B-stage | |
| 130 | 37 | 153 | 42 | 30 | 92 | 43 | 53 | 62 | 73 | 86 | seconds A-stage | DCP |
| 94 | 41 | 160 | 34 | 108 | 67 | 29 | 40 | 47 | 65 | 68 | seconds B-stage | |

EXAMPLES 18-21

The experiments in these examples show the effect of volatile siloxane constituents on the flame-repellency.

| | Parts by weight | | | | | |
|---|---|---|---|---|---|---|
| Base mixture I | 100 | | | | | |
| $TiO_2$ | 3 | | | | | |
| Pt | 40 ppm | | | | | |
| Cyanoguanidine | 0.2 | | | | | |
| $(me_2SiO)_4$ additive | 0 | 0.5 | 1.0 | 1.5 | 2.0 | parts by weight |
| CL 50 | 30 | 32 | 31 | 42 | 140 | seconds, self-extinguishing time |
| Consumption | 12 | 19 | 13 | 26 | 86% by weight | |

Base mixture II: 100 parts by weight of a polydimethylsiloxane which contains trimethylsilyl end groups, has a degree of polymerization of 6,000 and contains 0.175% of vinylmethylsiloxy groups are mixed with 27.5 parts by weight of a pyrogenic silicic acid with a surface area of 380 m²/g. 0.83 part of the vinyl-free silanol from base mixture I and 5.5 parts of the vinyl-containing auxiliary as well as 0.5 part of hexamethylsilazane are used as processing auxiliaries.

The H-siloxane employed in Examples 22-24 has the composition:

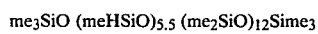

$me_3SiO(meHSiO)_{5.5}(me_2SiO)_{12}Sime_3$

| Examples | | 22 | 23 | 24 | |
|---|---|---|---|---|---|
| Base mixture II | | 100 | 100 | 100 | parts by weight |
| Platinum (ppm) | | 40 | 40 | — | |
| $TiO_2$ | | 3 | 3 | 3 | parts by weight |
| Si—H—siloxane | | 5 | 5 | 5 | parts by weight |
| Cyanoguanidine | | 0.2 | — | — | part by weight |
| Butinol (Pt inhibitor) | | 0.5 | 0.5 | 0.5 | part by weight |
| Pt—vulcanized | A | 33 | 180 | 190 | sec. |
| | B | 34 | 180 | 180 | sec. |
| CL 50, 1.5% | A | 44 | 180 | 180 | sec. |
| | B | 27 | 180 | 180 | sec. |
| DCP, 0.6% | A | 32 | 180 | 180 | sec. |
| | B | 27 | 180 | 180 | sec. |

EXAMPLES 26-30

As the following examples show, it is also possible to replace the pyrogenic $TiO_2$ by $TiO_2$ obtained from a precipitation or digestion process.
26 precipitated $TiO_2$, amorphous, not neutral, BET 50, 1.6% of S
27 precipitated $TiO_2$, amorphous, neutral, moist, BET 195, 0.075% of S
28 precipitated $TiO_2$, rutile, neutral, moist, BET 200
29 precipitated $TiO_2$, amorphous, neutral, dried, BET 195, 0.075% of S
30 pyrogenic $TiO_2$, anatas, pH 3-4, BET 50

| | | Parts by weight | | | | |
|---|---|---|---|---|---|---|
| Base mixture I | | 100 | 100 | 100 | 100 | 100 |
| Platinum (ppm) | | 45 | 45 | 45 | 45 | 45 |
| Cyanoguanidine | | 0.3 | 0.3 | 0.3 | 0.3 | 0.3 |
| 26 | | 3 | — | — | — | — |
| 27 | | — | 3 | — | — | — |
| 28 | | — | — | 3 | — | — |
| 29 | | — | — | — | 3 | — |
| 30 | | — | — | — | — | 3 |
| CL 50 | A | over 200 | 120 | 77 | 46 | 67 sec. |
| | B | 107 | 28 | 42 | 35 | 33 sec. |
| DCP | A | | | | 46 | 36 sec. |
| | B | | | | 26 | 28 sec. |

It will be appreciated that the instant specification and examples are set forth by way of illustration and not limitation, and that various modifications and changes may be made without departing from the spirit and scope of the present invention.

What is claimed is:

1. In a polysiloxane molding composition which can be cured to give flame-repellent products, comprising
(a) a diorganopolysiloxane of the formula

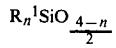

in which n is 1.9 to 2.05, and $R^1$ is an alkyl, alkenyl and/or aryl radical with 1–8 C-atoms, (b) a finely divided silicic acid, (c) finely divided $TiO_2$ with a surface area, measured by the BET method, greater than 20 m²/g and a particle size less than 0.5 um, (d) platinum and/or one of its sulphur-free compounds, and (e) a curing agent, the improvement which comprises about 0.05 to 10% by weight of (a) to (e) of a nitrogen compound selected from the group consisting of a cyanoguanidine and an arylguanidine or a salt thereof.

2. A polysiloxane molding composition according to claim 1, wherein the finely divided $TiO_2$ is obtained by decomposition and precipitation in water.

3. A polysiloxane molding composition according to claim 1, additionally containing a heat stabilizer.

4. A flame-repellent article produced by molding and curing a composition according to claim 1.

* * * * *